March 1, 1938.   E. G. SCHLAYER ET AL   2,109,450
METHOD OF AND MECHANISM FOR SHAPING MANICURE STICKS
Filed Feb. 9, 1935   12 Sheets-Sheet 1
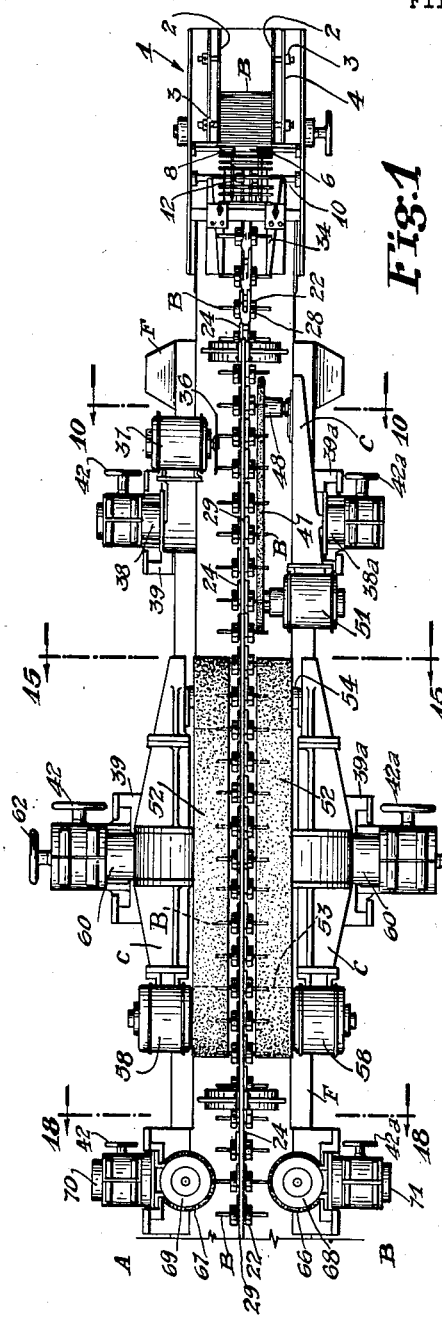
Earl G. Schlayer and
Gerhard F. Kullack   INVENTORS
BY Hock & Blum
ATTORNEYS

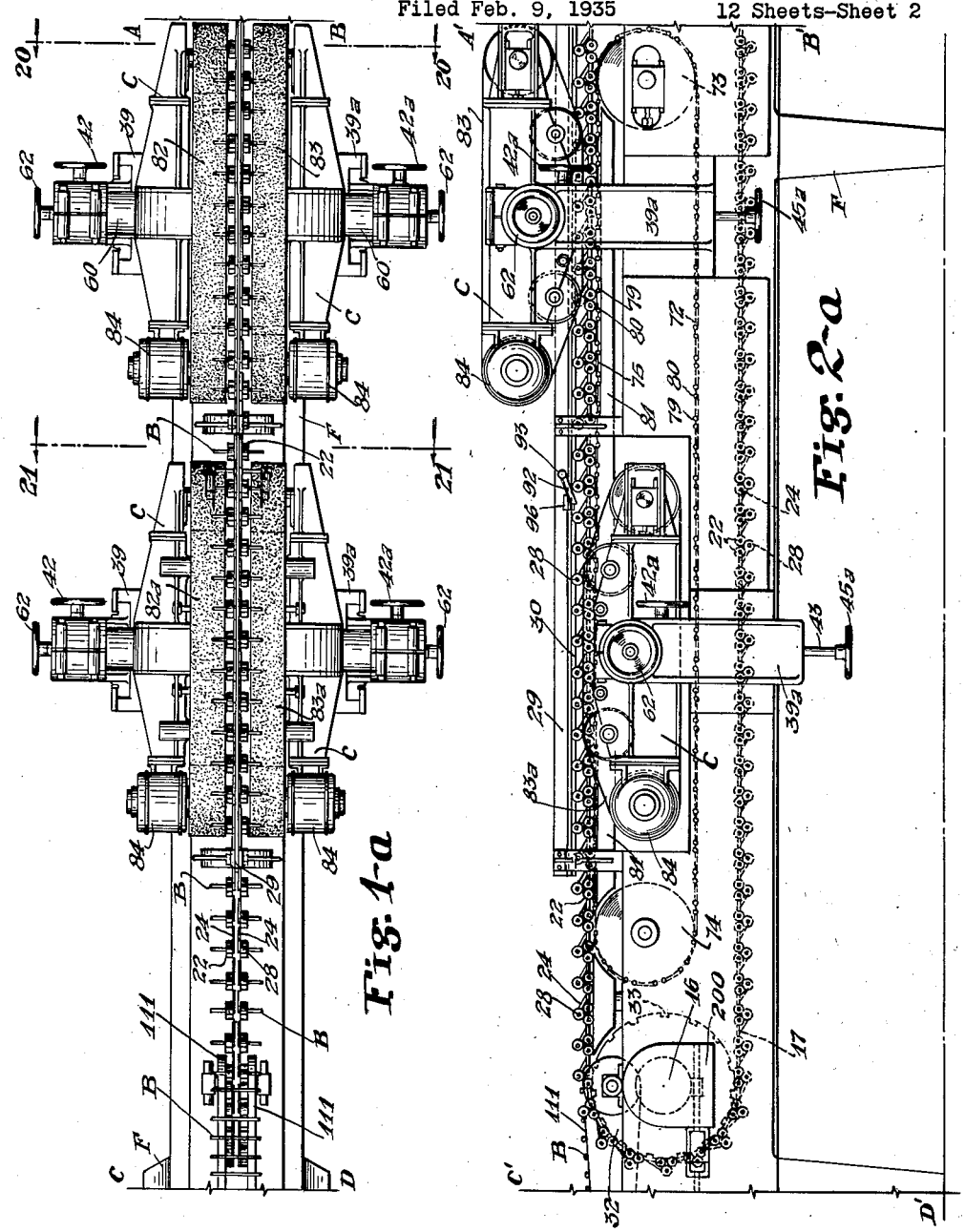

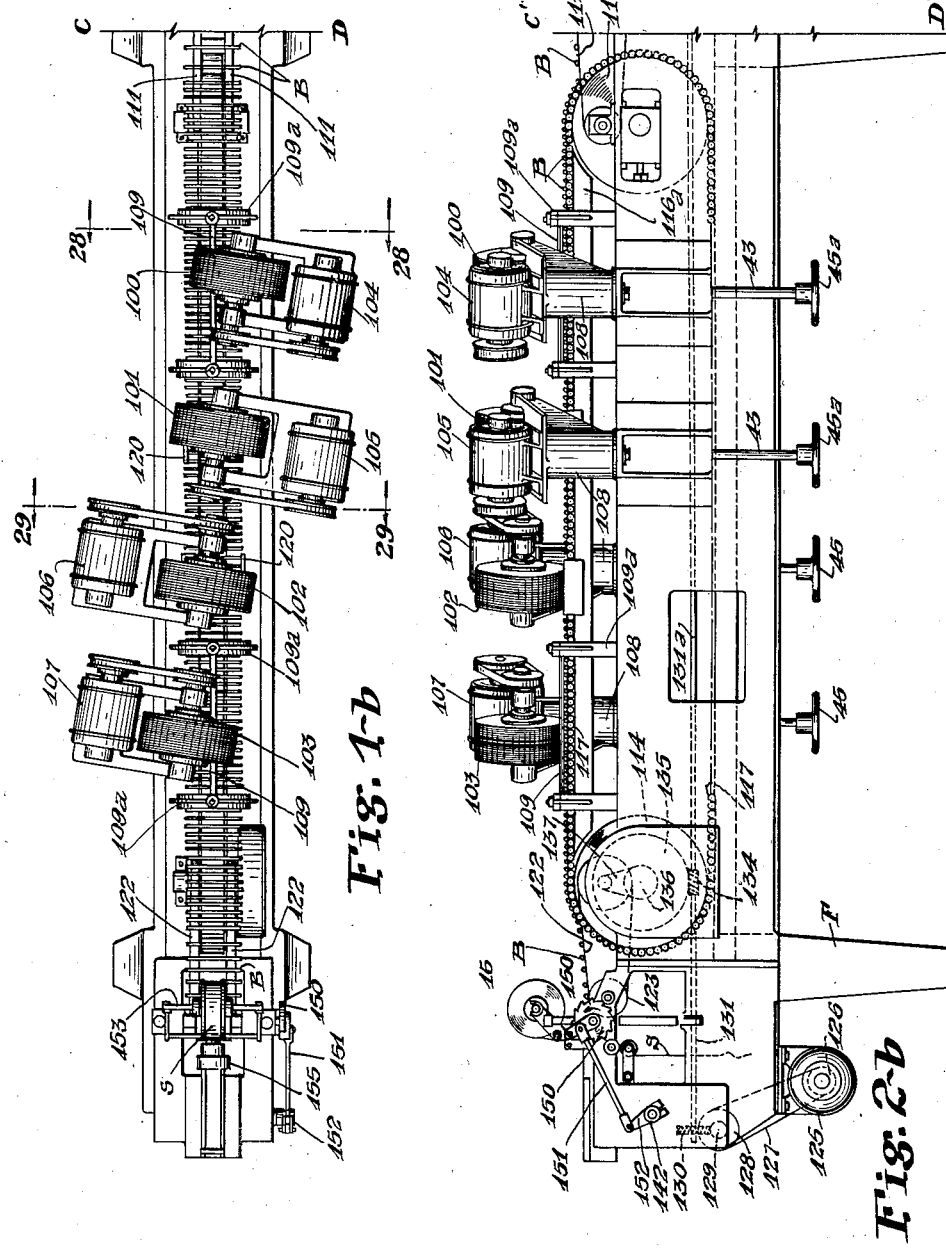

March 1, 1938.   E. G. SCHLAYER ET AL   2,109,450
METHOD OF AND MECHANISM FOR SHAPING MANICURE STICKS
Filed Feb. 9, 1935   12 Sheets-Sheet 4

INVENTORS
Earl G. Schlayer
Gerard F. Kirdack
BY
ATTORNEYS

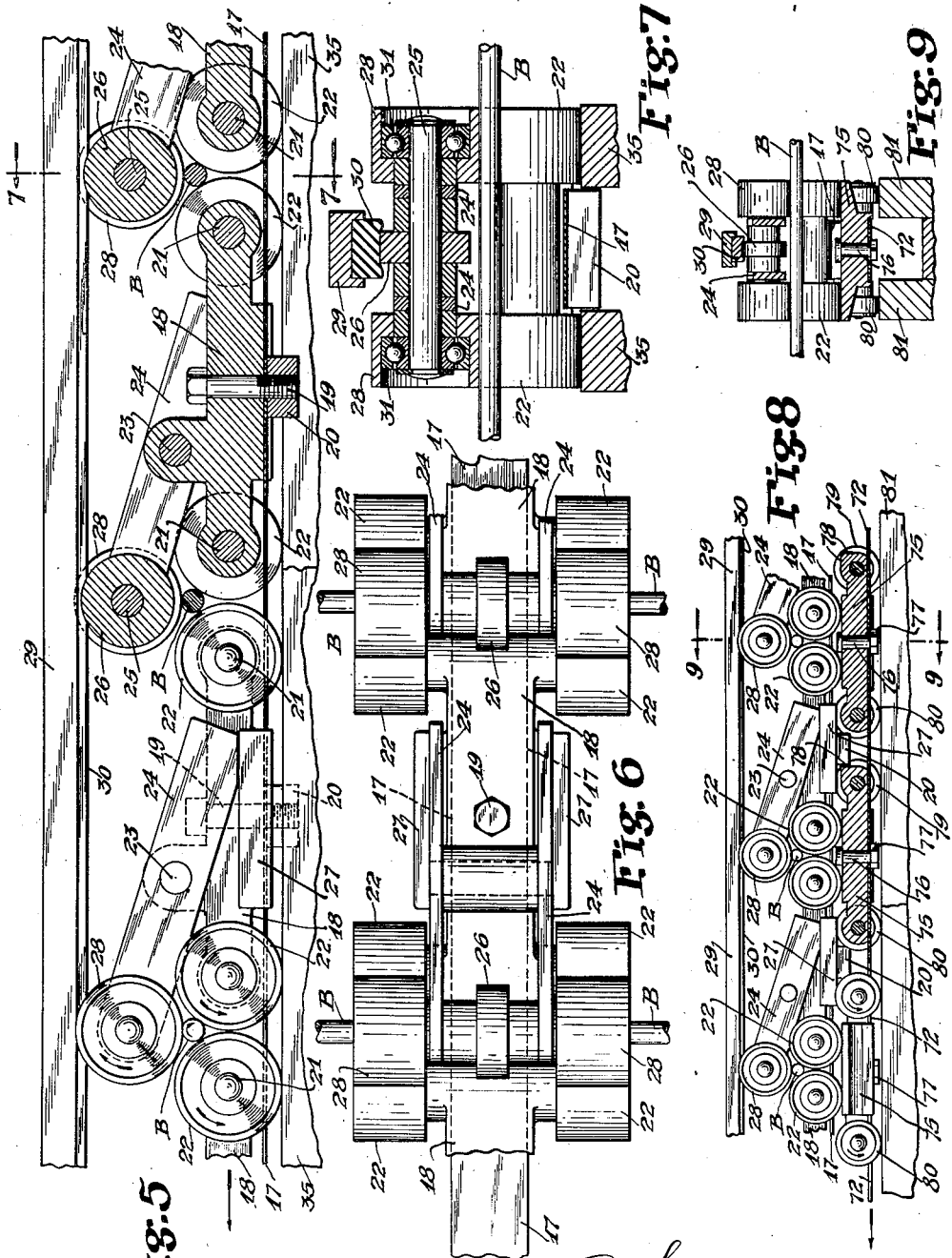

March 1, 1938. E. G. SCHLAYER ET AL 2,109,450
METHOD OF AND MECHANISM FOR SHAPING MANICURE STICKS
Filed Feb. 9, 1935     12 Sheets-Sheet 6
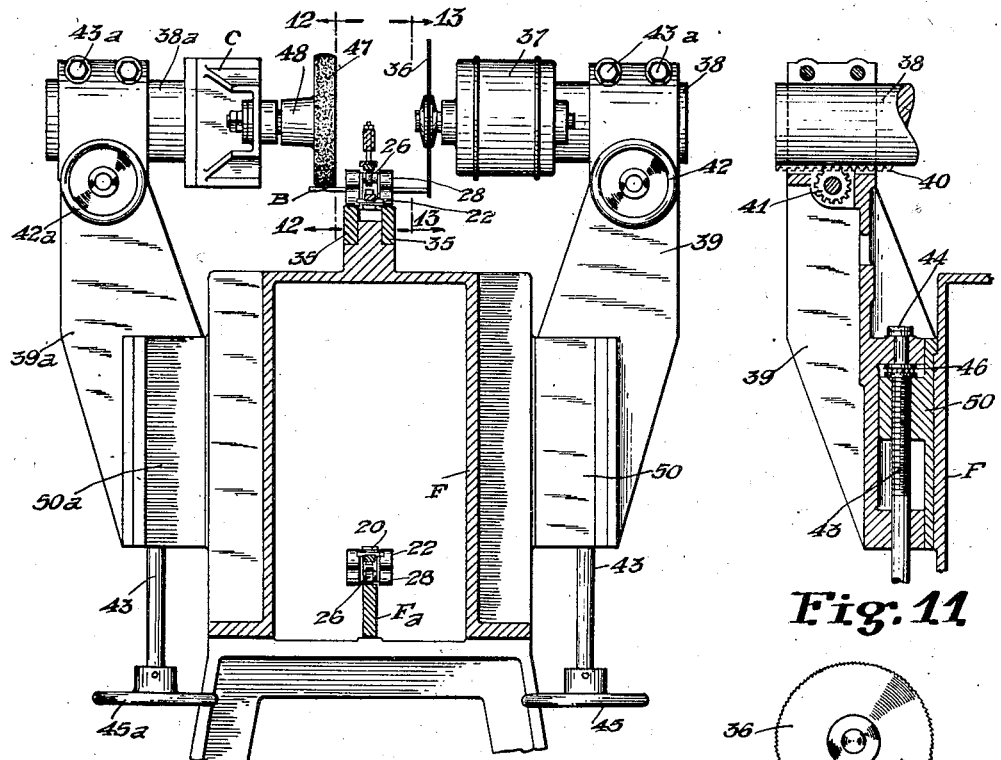
Fig. 10
Fig. 11
Fig. 13
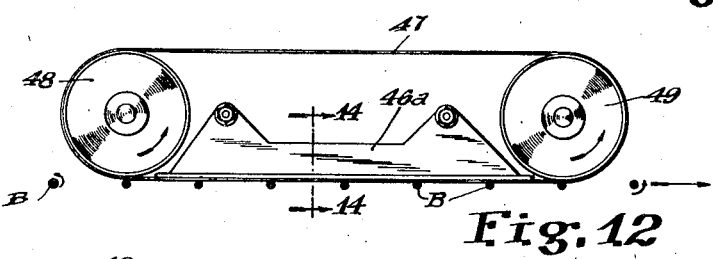
Fig. 12
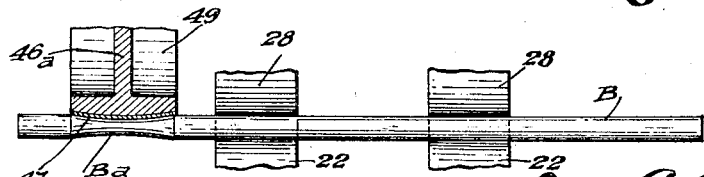
Fig. 14
INVENTORS
Earl G. Schlayer and
Richard F. Kuback
BY Hock Blum
ATTORNEYS March 1, 1938. E. G. SCHLAYER ET AL 2,109,450
METHOD OF AND MECHANISM FOR SHAPING MANICURE STICKS
Filed Feb. 9, 1935 12 Sheets—Sheet 8

INVENTORS
Carl G. Schlayer and
Gerhard F. Kullack
BY
Hock & Blum
ATTORNEYS

March 1, 1938. E. G. SCHLAYER ET AL 2,109,450
METHOD OF AND MECHANISM FOR SHAPING MANICURE STICKS
Filed Feb. 9, 1935 12 Sheets-Sheet 9
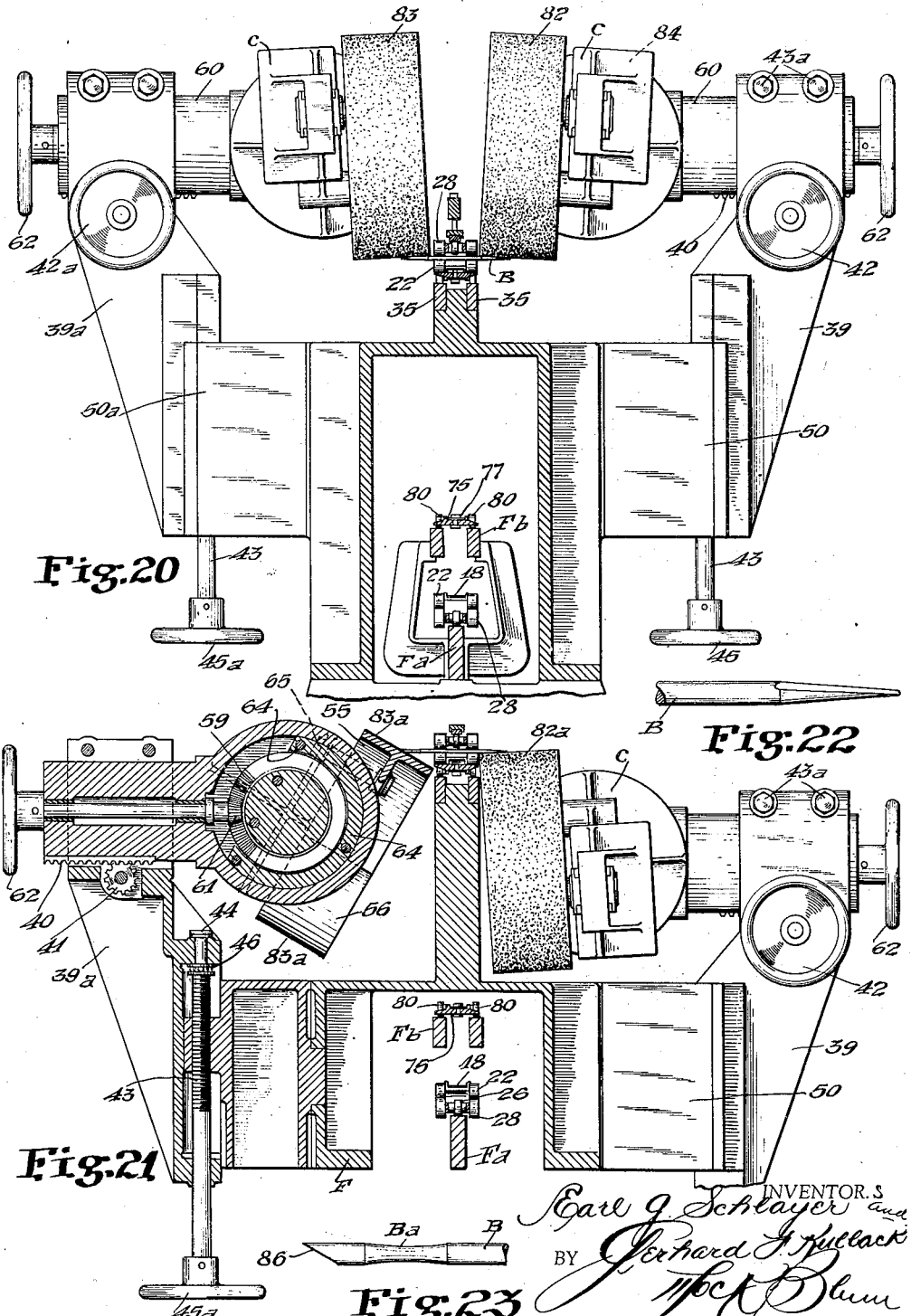

March 1, 1938.  E. G. SCHLAYER ET AL  2,109,450
METHOD OF AND MECHANISM FOR SHAPING MANICURE STICKS
Filed Feb. 9, 1935  12 Sheets-Sheet 10
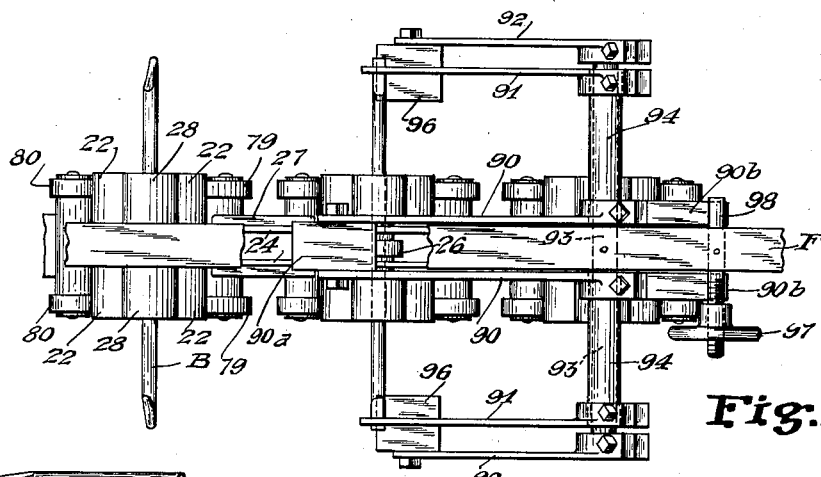
Fig.24
Fig.27
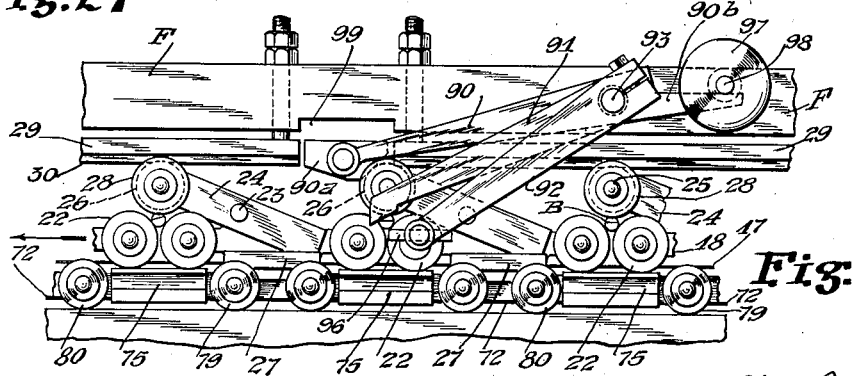
Fig.25
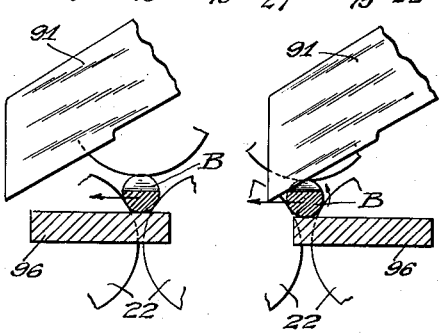
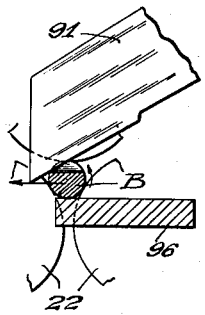
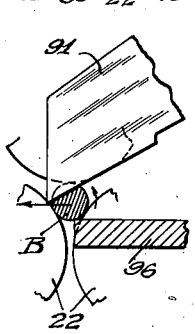
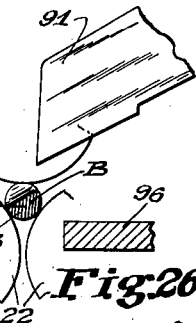
Fig.26a  Fig.26b  Fig.26c  Fig.26d
INVENTORS
Earl G. Schlayer and
Gerhard F. Kullack
BY
Hoch & Blum
ATTORNEYS March 1, 1938. E. G. SCHLAYER ET AL 2,109,450
METHOD OF AND MECHANISM FOR SHAPING MANICURE STICKS
Filed Feb. 9, 1935 12 Sheets-Sheet 11
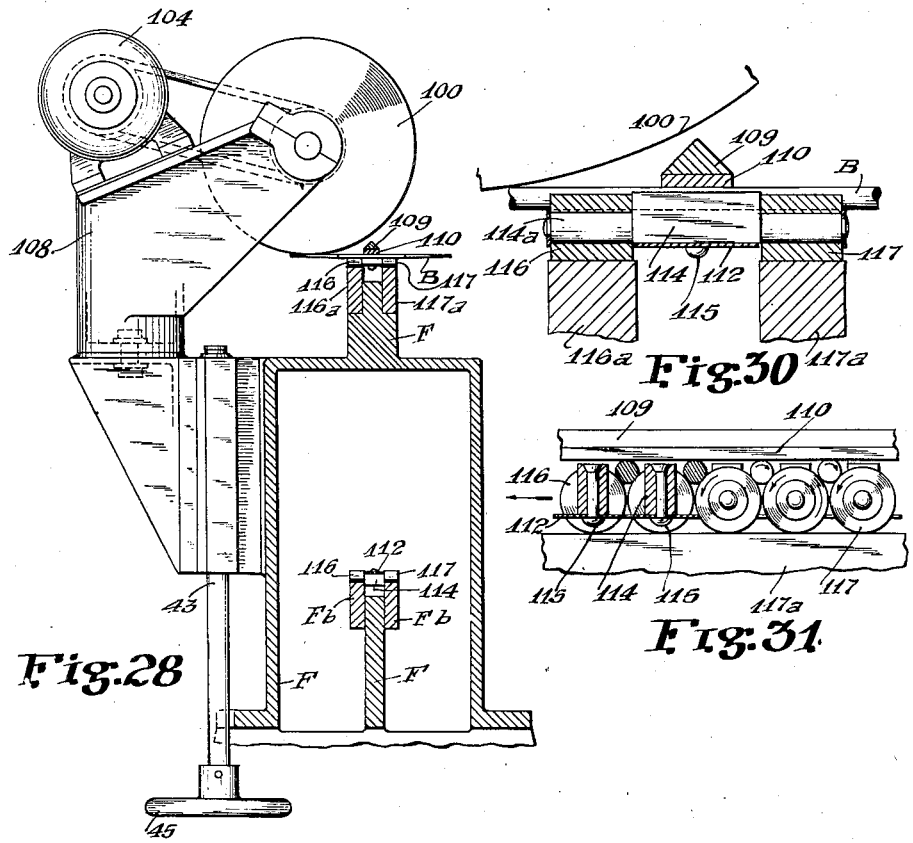
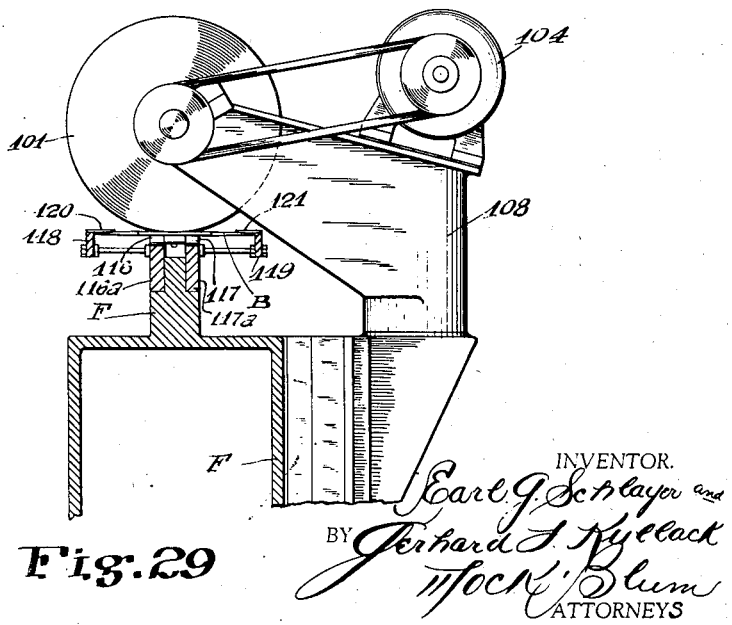
INVENTOR.
Earl G. Schlayer and
BY Gerhard S. Kjellack
Mock & Blum
ATTORNEYS

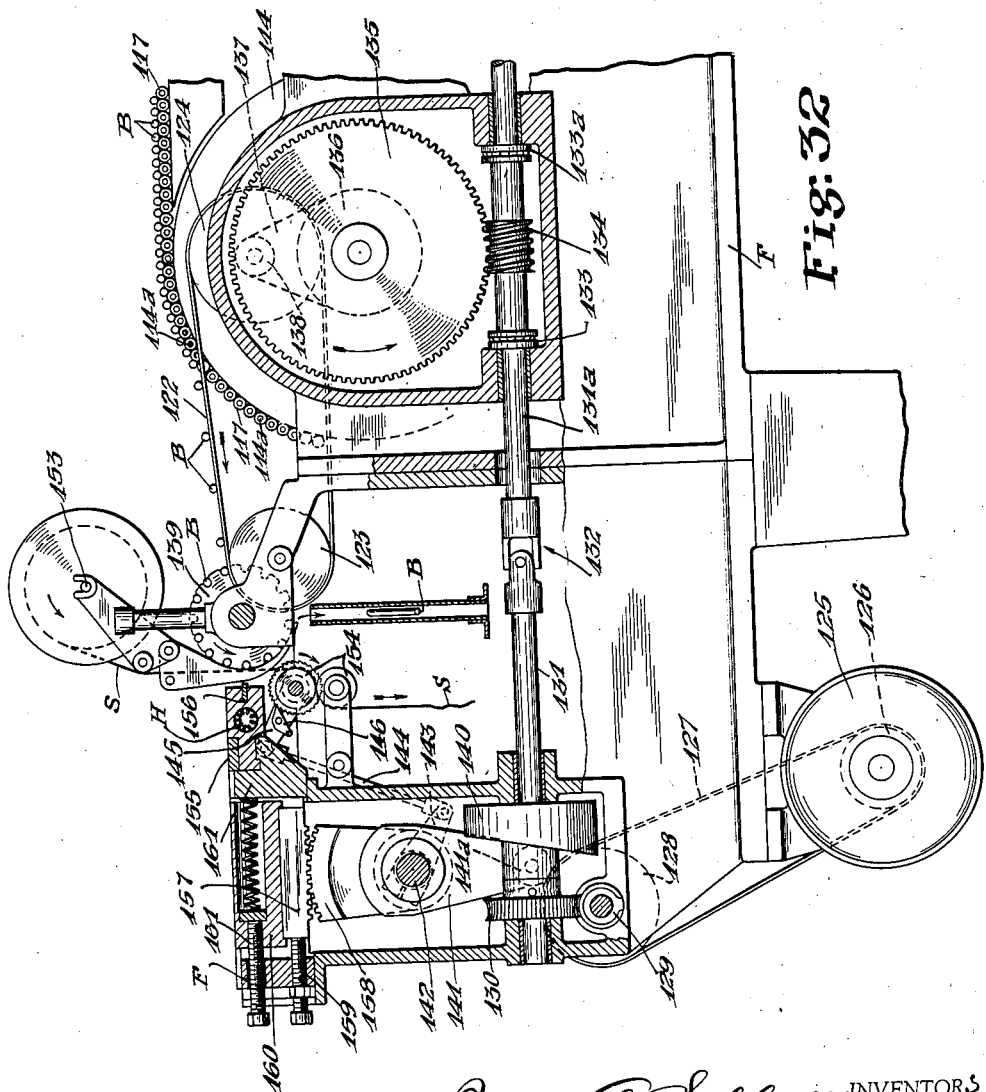

Patented Mar. 1, 1938

2,109,450

UNITED STATES PATENT OFFICE 2,109,450

METHOD OF AND MECHANISM FOR SHAPING MANICURE STICKS

Earl G. Schlayer, Scarsdale, and Gerhard F. Kullack, Flushing, N. Y., assignors to Northam Warren Corporation, New York, N. Y., a corporation of New York Application February 9, 1935, Serial No. 5,822

15 Claims. (Cl. 144—3)

Our invention relates to a new and improved method of and mechanism for shaping, polishing and printing or decorating manicure sticks, or other articles. While the invention is particularly adapted to the manufacture of sticks, it is not limited to this purpose.

One of the objects of our invention is to provide a mechanism for and method of shaping a stick made of orangewood or the like, so that the sticks can be shaped from suitable blanks, which may be cylindrical. Each of these blanks may be shaped so that one end of each blank is provided with a smooth conical point, and the other end of the stick has a wedge-shaped point. The method may be varied, so as to provide one or both ends of the stick, with points of any desired shape. Save for the planar face or faces of said wedge-shaped point, the transverse elements of the shaped stick may be either circles or portions of circles.

Another object of our invention is to provide a complete machine whereby the necessary shaping and printing operations are performed automatically and at minimum cost.

Other objects of our invention will be set forth in the following description and drawings which illustrate a preferred embodiment thereof, it being understood that the above statement of the objects of our invention is intended to generally explain the same without limiting it in any manner.

Figs. 1, 1a and 1b represent a complete plan view of the machine and these views may be assembled by placing Fig. 1b at the left and then locating Fig. 1a between Fig. 1b and Fig. 1. That is, the lines C—D of Figs. 1b and 1a are supposed to coincide and the lines A—B of Figs. 1a and 1 are supposed to coincide.

Figs. 2, 2a and 2b are a corresponding side elevation of the complete machine, these figures being arranged in the order previously specified. That is, the lines C'—D' of Figs. 2b and 2a are supposed to coincide and the lines A'—B' of Figs. 2a and 2 are supposed to coincide.

Fig. 5 is a side elevation, partially in section, showing the first feeding device for feeding the blanks, while the blanks are being partially shaped.

Fig. 6 is a partial top plan view of Fig. 5.

Fig. 7 is a sectional view along the line 7—7 of Fig. 5.

Fig. 8 is a detail side elevation, showing the mechanism for locking the holders of the blanks against turning, during certain steps of the shaping operation.

Fig. 9 is a sectional view on the line 9—9 of Fig. 8.

Fig. 10 is a sectional view on the line 10—10 of Fig. 1.

Fig. 11 is a sectional view, partially in elevation, showing the means for adjusting the grinding belt or member, which shapes the ends of the blanks into conical or other form.

Fig. 12 is a detail side elevation showing the abrading belt which is used for shaping the blanks. This is an elevation, partially in section, on the line 12—12 of Fig. 10.

Fig. 13 is a side elevation of a cutting member or saw, which cuts the oversized blanks to the required size. This is an elevation, partially in section, on the line 13—13 of Fig. 10.

Fig. 14 is a sectional view on the line 14—14 of Fig. 12.

Fig. 20 is a sectional view on the line 20—20 of Fig. 1a.

Fig. 21 is a sectional view on the line 21—21 of Fig. 1a.

Fig. 22 is an elevation showing the finally shaped end of one type of manicure stick.

Fig. 23 is a view similar to Fig. 22, showing another type or shape which can be formed by means of the apparatus.

Fig. 24 is a top plan view of the mechanism for forming the chisel-shaped end in one type of manicure stick.

Fig. 25 is a side elevation of Fig. 24.

Figs. 26a, 26b, 26c and 26d illustrate the successive positions of the blank and of the member for turning the blank, in the shaping of the end of the blank to one type of tapered form.

Fig. 27 shows one end of one type of a manicure stick, which can be made by the machine or method specified herein.

Fig. 28 is a sectional view on the line 28—28 of Fig. 1b.

Fig. 29 is a sectional view on the line 29—29 of Fig. 1b.

Fig. 30 is an enlarged sectional view, partially in elevation, showing the buffing or polishing of the stick, subsequent to the shaping thereof.

Fig. 31 is an enlarged view showing the mechanism for feeding the blanks, subsequent to the polishing thereof, into the printing mechanism.

Fig. 32 is an enlarged sectional view, partially in elevation, showing the printing mechanism and the means for feeding the blanks to said mechanism.

Figure 3:
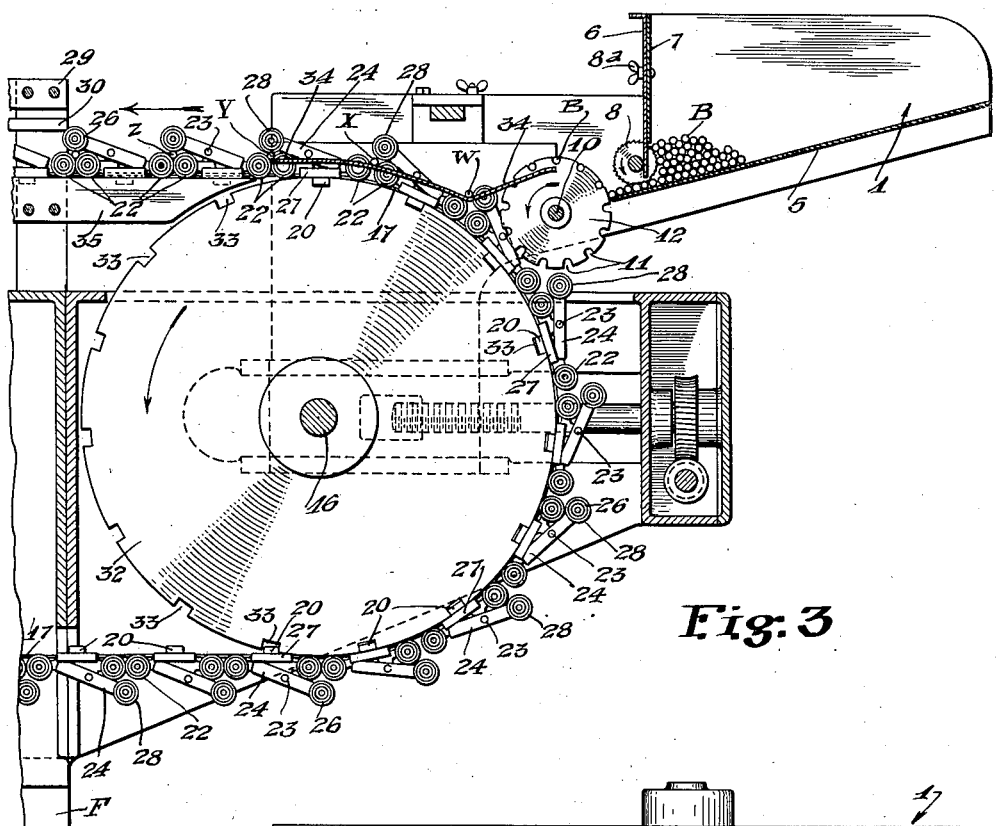
Fig. 3 is a side elevation, partially in section, showing the right hand or feeding end of the machine, to which the cylindrical blanks are supplied.

Referring to Fig. 2, and Fig. 3, the blanks B which are to be operated upon, may be ordinary cylindrical blanks made of any suitable wood or other material. These blanks may be made of orangewood.

The blanks are piled into a hopper 1, having an inclined bottom face. As indicated in Fig. 2, the depth of the hopper is equal to the length of a blank, and the blanks are piled neatly into said hopper, so that all the blanks are substantially parallel to each other, said direction being parallel to the transverse dimension of the hopper.

The hopper is provided with side walls 2, and the distance between said side walls can be adjusted by means of adjusting screws 3 which are connected to fixed walls 4. The bottom edges of the walls 2 and 4 are inclined so as to correspond to the inclination of the bottom wall 5 of the hopper 1.

Figure 4:
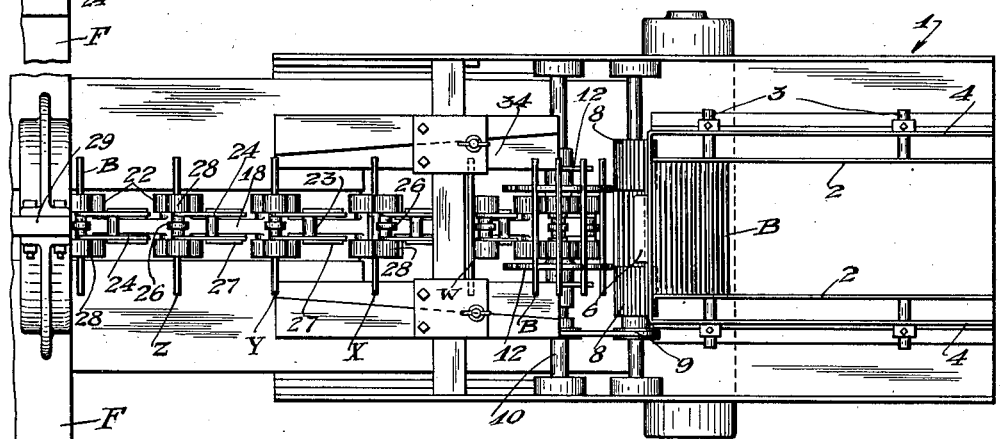
Fig. 4 is a top view of Fig. 3.

Referring to Fig. 3, the hopper is provided with an adjustable front wall or gate 6, and this is adjustably connected to a fixed wall 7, by means of a clamping screw 8a. The gate 6 may have a longitudinal slot through which the shank of the clamping member 8 passes, and the opening which is defined by the bottom edge of the gate 6, is regulated so as to correspond to the thickness of a blank B. The blanks are therefore caused to pass out of the hopper 1 in a single row, the blanks in said row being parallel to each other, as indicated in Fig. 4.

In order to maintain the blanks in said desired relation, a roll 8, whose periphery may be covered with grooved rubber or other friction material, is caused to turn in the direction of the arrow which is indicated in Fig. 3, so that the bottom edge of the roll 8 turns in a direction contrary to the direction of feed of the blanks out of the hopper. This roll rearwardly feeds any blanks which may be superposed on said single row, while permitting the blanks in said row to roll down the extension of the inclined bottom 5, which extends beyond gate 6.

Referring to Fig. 2, the shaft of the roll 8 is provided with a suitable sprocket which meshes with chain 9, said chain 9 meshing with a suitable sprocket which is provided on the shaft 10.

The blanks are individually taken up in the transverse pockets 11 of a drum 12 which is mounted upon the shaft 10.

As shown in Fig. 3, the drum 12 is caused to turn in the counterclockwise direction, so that each of the blanks B is moved upwardly and away from the edge of the bottom 5 of the hopper 1.

As shown in Fig. 2, the shaft 10 of the drum 12 is provided with a suitable sprocket, which is driven by means of a chain 15, which meshes with a sprocket which is mounted upon the shaft 16.

The blanks B are moved away from the pockets of the drum 12, by means of an endless or belt-type carrier which is shown in Figs. 3, 5, and 6. Said belt-type carrier comprises an endless belt 17, which is made of flexible steel or other suitable metal or material.

A series of castings 18 are connected to the belt 17, by means of bolts 19, whose threaded ends enter internally threaded openings, which are provided in cross members 20. At each end of each casting 18, a shaft 21 is provided.

Referring to Figs. 5 and 6, rollers 22 are mounted upon the respective stud shafts 21. These rollers 22 are located transversely beyond the edges of the belt 17, so that said rollers 22 do not overlie any part of the belt 17.

Each of the castings 18 is also provided with another transverse stud shaft 23. A pair of separated arms 24 are turnably mounted upon each stud shaft 23. A stud shaft 25 is connected to each pair of arms 24, and a roller 26 is turnably mounted upon each stud shaft 25.

Referring to the left-hand side of Fig. 5, the right-hand ends of the arms 24 are provided with planar faces, which are adapted to abut stops 27. These stops 27 are integral with the castings 18.

The stops 27 are also located laterally beyond the longitudinal edges of the endless belt 17, so that the arms 24 and the stops 27 do not overlie any part of the belt 17. The dotted lines which are indicated by the reference numeral 17 in Fig. 6, indicate the position of the edges of said belt 17. Each stud shaft 25 is also provided with a pair of rollers 28 which are of greater diameter than the respective intermediate roller 26. Each roller 26 is keyed to its shaft 25, although each roller 26 may be freely mounted on its shaft 25, so that each roller 26 can then turn relative to its shaft 25. Rollers 28 can turn relative to each respective shaft 25, anti-friction bearings 31 being provided for this purpose, as shown in Fig. 7.

Hence the rollers 26 need not turn in unison with their respective rollers 28.

The rollers 26 are provided with friction material at their outer peripheries such as soft rubber or the like, and said rollers 26 are adapted to be driven frictionally, at the proper stage of the operations, by means of a stationary rail 29. This rail 29 is of channel shape, as shown in Fig. 7. The longitudinal recess of the rail 29 holds a friction member 30, which is also made of soft rubber.

As shown in Fig. 7, the underface of the friction member 30 is provided with a groove or recess which corresponds generally to the width of the rollers 26.

The friction member 30 causes rollers 26 to be forced downwardly, and arms 24 are thereby forced downwardly, so as to press the rollers 28 against the blanks B, so that each blank B is clamped between a pair of rollers 28 and two pairs of rollers 22. This clamping position is shown in Fig. 5. The weight of rollers 28 and 26 also assists in securing said clamping action.

As the belt 17 is actuated, the rollers 26 turn, together with their shafts 25, during the period that the rollers 26 remain in frictional contact with the friction member 30.

Referring to Fig. 3, this shows one of a pair of sprockets or recessed drums 32, having recesses 33, which engage the cross pieces 20 of belt 17. The other sprocket 32 is shown at the left-hand side of Fig. 2a. Said sprockets support and actuate belt 17.

Referring to the lower run of the belt 17, it can be seen that the weight of the rollers 26 and 28 turns the arms 24, until the ends of the arms 24 abut the stop members 27.

Referring to Fig. 3, this also shows guide plates 34, and these guide the blanks B as they move away from the revolving drum 12. As shown in Fig. 4, the length of each blank B exceeds the length of the drum 12 so that the guide plates 34 which are provided at each end face of the drum, engage the free or projecting ends of the blanks B.

In the position of the blank which is indicated by W in Fig. 3, the blank has almost arrived at a position in which it is located between rollers 28 and associated rollers 22.

In the position which is indicated by X in Fig. 3, each blank is located between two pairs of rollers 22 and a pair of rollers 28.

In the position indicated by Y in Fig. 3, each blank has moved further, into a position in which it can be gripped by said rollers.

As each blank moves to the position Y, it leaves the guide plates 34, and then the force of gravity causes the arms 24 to turn counter-clockwise, so that each blank is gripped between the rollers previously specified, by the force of gravity. In the position indicated by Z, the blank is spaced from the inner ends of said guide plates 34.

Referring again to Fig. 3, the machine is provided with a pair of rails 35, with which the rollers 22 contact, after the blank has passed beyond the position Y. These rails cause the rollers 22 to turn in the same direction, which is shown as being counter-clockwise in Fig. 3. Said rails 35 also furnish additional support to belt 17.

Hence the adjacent portions of the peripheries of each pair of rollers 22 turn in opposite directions. This causes each blank B to be turned around its own axis, this being clockwise in Fig. 3. This turning of the blanks is permitted by the non-frictional free mounting of the rollers 28 upon their shafts 25.

While each blank is being turned around its own axis, it may be subjected to a number of shaping and trimming operations, some of which may be omitted, and these shaping and trimming operations may be varied according to the blank supplied, and according to the final shape of the completed stick. Each blank B is thus caused to turn around its own axis, for a period in the operation of the machine, which is dependent upon the number of trimming and/or shaping operations.

For example, the ends of the blanks may be cut off, so as to reduce their lengths, in case the blanks which are supplied to the machine are of irregular lengths. If this trimming operation is utilized, it is the first operation of the machine, after the blanks have been caused to continuously turn around their own axes. This trimming mechanism is shown in Figs. 10, 11, and 13.

The trimming device comprises a saw 36 which is caused to turn by a suitable electric motor 37. The motor 37 is mounted on adjustable arm 38 which is provided with a slide bearing in a bracket 39 which is connected to the stationary frame of the machine.

As shown in Fig. 11, the arm 38 is provided with rack teeth 40, and these teeth 40 mesh with a pinion 41 which can be actuated by a hand wheel 42. The arm 38 is held in adjusted position in its bearing by any suitable clamping means, such as the set screws 43a. The arm 38 is prevented from turning in its slide-bearing, by any suitable means.

Likewise, and if desired, the bracket 39 may be made vertically adjustable, so as to allow for different thicknesses of blanks, and for other purposes.

For this purpose, the bracket 39 may be slidably mounted in a slot of a vertical guide-bearing 50 which may be integral with, or which may be suitably connected to the fixed frame F of the machine.

An adjusting screw 43 passes through an internally threaded bore of the bearing 50, and said adjusting screw 43 is turned by wheel 45 and it is provided with a head which abuts a corresponding face of an end-thrust bearing 46. Said end-thrust bearing 46 comprises a pair of collars or races between which anti-friction members are located. The upper collar of the end-thrust bearing has a shank which extends beyond the upper face of bracket 39, and this shank is held in fixed position relative to bracket 39, by means of removable collar 44. When the screw 43 is turned by means of the wheel 45, said screw 43 moved up or down relative to member 50, and this up or down movement is transmitted to the end-thrust bearing 46, so as to raise or lower the bracket 39, which can slide relative to member 50.

The next operation is to form a section Ba in each blank B as illustrated in Fig. 14, so as to form said section Ba with concave longitudinal elements. This operation may be omitted, if desired.

The mechanism for shaping the section Ba is shown in Figs. 12 and 14.

A bracket 46a is suitably connected to the frame of the machine, and an endless grinding belt 47 passes around pulleys 48 and 49, whose shafts are supported on extensions of said bracket 46a. The bottom surface of the bracket 46a is of convex transverse contour, as shown in Fig. 14.

The grinding belt 47 is made of any suitable flexible material which is coated or otherwise provided with any suitable abrasive, and the bottom run of the belt 47 is maintained slidably abutting the convex bottom surface of the bracket 46a by means of the tension of the belt. Hence, the convex grinding surface of the belt 47 forms the segment Ba into the desired shape.

Referring to Fig. 1, the hub of the pulley 48 is driven by an electric motor 51, so that the belt 47 is continuously operated.

Referring to the left-hand side of Fig. 10, the motor 51 is mounted upon an arm 38a, which can be horizontally and vertically adjusted, exactly like the arm 38 which has previously been mentioned. By raising the arms 38 or 38a sufficiently, the mechanisms associated therewith can be raised until they do not operate on the blanks. Bracket 46a is integral with or is suitably connected to arm 38a. The wheel 45a corresponds to the wheel 45, the bracket 39a corresponds to the bracket 39, and the guide 50a corresponds to the guide 50, and the wheel 45a corresponds to the wheel 45.

Figure 15:
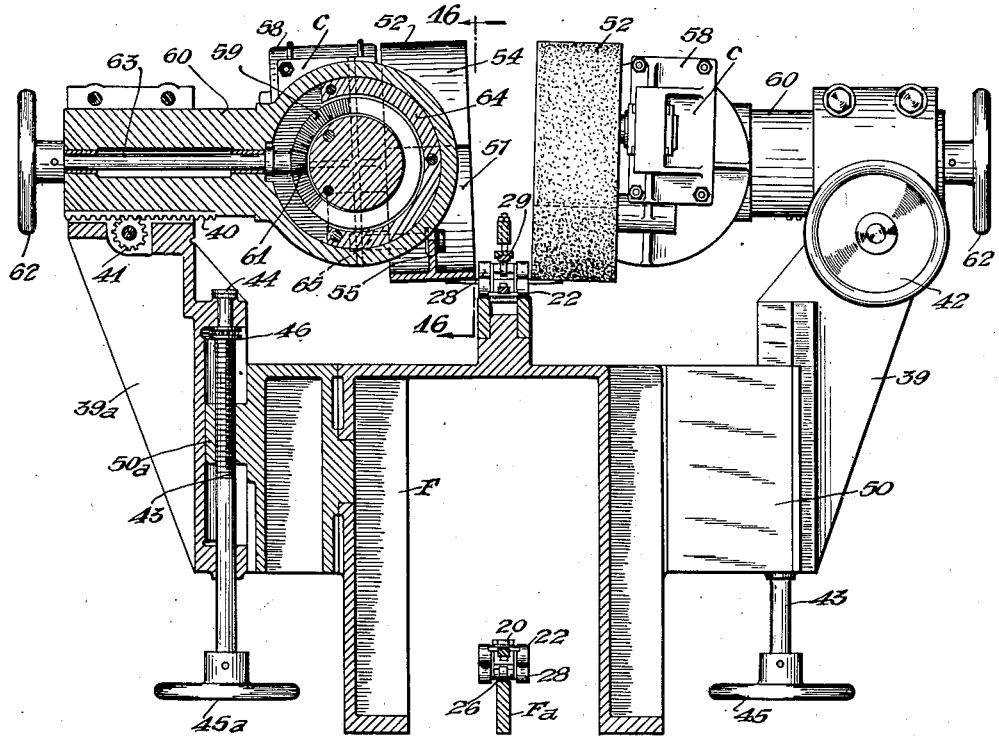
Fig. 15 is a sectional view on the line 15—15 of Fig. 1.
Figure 16:
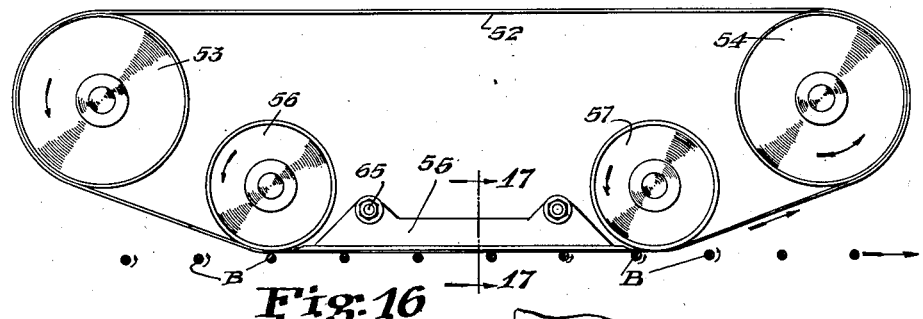
Fig. 16 is a sectional view, partially in section, on the line 16—16 of Fig. 15.
Figure 17:
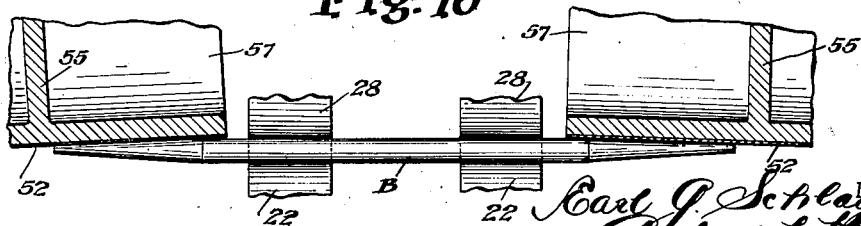
Fig. 17 is a sectional view on the line 17—17 of Fig. 16.

The next operation is to form one of the ends of each blank with a conical or frusto-conical point, if it is desired to make a manicure stick of this type. For this purpose, we utilize the attachment which is shown in Figs. 15, 16, and 17. As previously stated, the machine may be used for making manicure sticks of different shapes or types, and the parts of the machine which are utilized depend upon the shape of manicure stick which is desired.

Likewise, and if desired, each blank can be provided with a conical point at each end thereof, instead of being provided with a conical point at only one end thereof.

Referring to Figs. 15-17, these show a pair of grinding belts 52 of the type previously described. Each grinding belt 52 passes around a pair of pulleys 53 and 54. Brackets 55 are connected to the frame of the machine, and the bottom surface of each said bracket 55 is substantially planar, as shown in Fig. 17. These brackets may be held with their bottoms inclined. The belts 52 slidably abut the inclined undersides of the brackets 55, so that the bottom runs of said belts are maintained in planar form, and follow the inclinations of the bottom surfaces of brackets 55.

Take-up idler pulleys 56 and 57 can also be utilized. The pulley 53 of each said belt is operated by means of a motor 48. The pulleys 53, 54, 56, and 57 are revolubly mounted on the brackets 55.

Referring to Fig. 15, each bracket 55 is connected by bolts 65 to a partial sleeve 64, which is mounted to turn around a horizontal axis, which is parallel to the direction of feed of blanks B.

Each said partial sleeve 64 is connected to a bevel gear 59. As shown in Fig. 2, each pulley 53 is driven by an electric motor 58. The casing of each motor 58 is connected by a suitable arm to one of the bevel gears 59. Each bevel gear 59 is turned by means of a smaller bevel gear 61, having a shaft 63 which is operated by hand wheel 62. Each shaft 63 has a bearing in the bore of an arm 60, which is slidably and nonturnably located in the bearing of a bracket 39 or 39a. Hence by turning wheels 62, the motors 48 and brackets 55 can be turned, until the bottom faces 52 of brackets 55 are inclined at any desired angles to the blanks and said angles may be equal or unequal.

Said arms 60 can be horizontally and vertically adjusted, by means which have previously been described.

Each bracket 55 is adjustably connected to the respective partial sleeve 64, by means of said bolts 65 so that the distance of each bracket 55 from its sleeve 64 can be adjusted. By means of these adjustments, allowance can be made for blanks having different lengths, and allowance can also be made for blanks having different thicknesses, by regulating the tapers of the conical points.

If it is desired to form a blank with a conical point at only one end, one of the motors 58 together with the accompanying parts, may be raised by raising the respective arm 60, so as to render one of said attachments inoperative.

The next operation which may be performed by the machine, is to shape one or both tips of the blank, so as to provide said tip with a rounded convex contour. For example, if the blank has been formed with a conical point at one or both ends, the top of said sharp conical point may be slightly rounded. Likewise, if a conical point has been formed only at one end of the blank, and the other end of the blank has an end surface of planar shape, said planar end surface can be rounded into partial ball shape.

Figure 18:
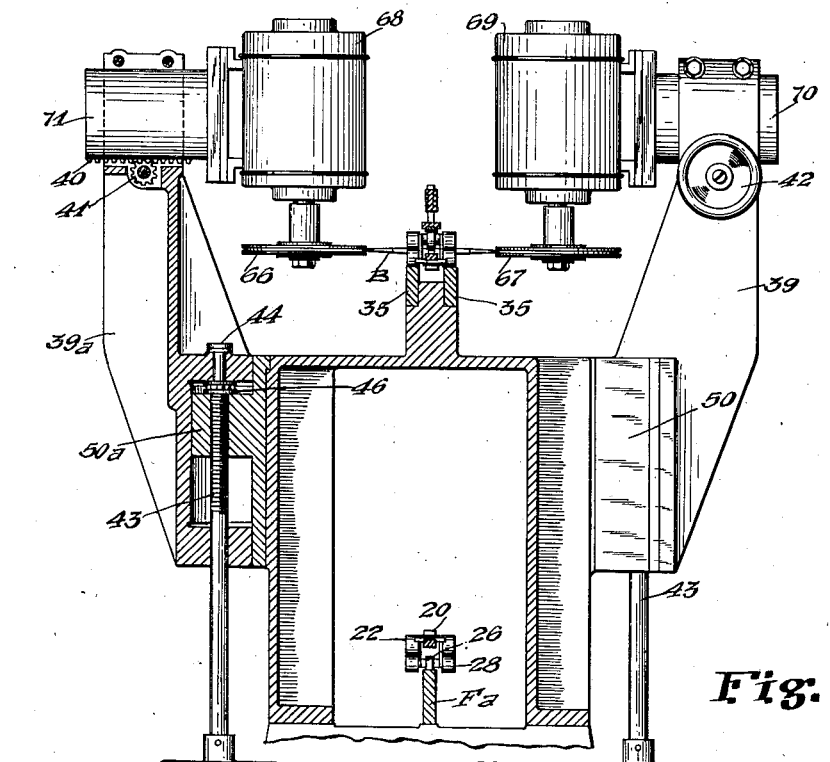
Fig. 18 is a sectional view, partially in elevation, on the line 18—18 of Fig. 1.
Figure 19:
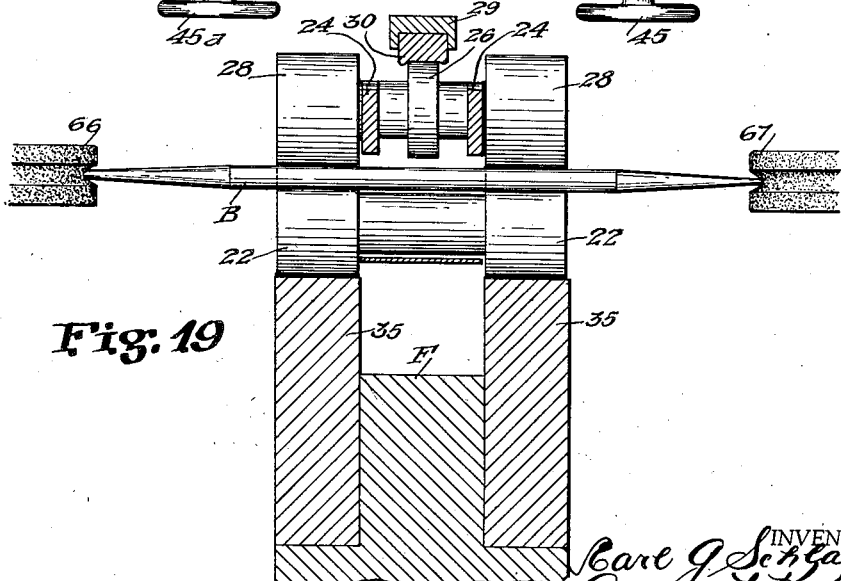
Fig. 19 is an enlarged elevation, partially in section, showing the mechanism for bevelling the points of the blanks.

In Figs. 18 and 19 we have illustrated mechanism for rounding the pointed tips of a blank which has been operated upon by the mechanism which is shown in Fig. 17.

It is to be understood that the operation illustrated in Fig. 17 can be performed until the tip of the point of the blank is as sharp as may be desired.

Fig. 19 shows a pair of grinding wheels 66 and 67, and in this embodiment they are shown as being of identical shape. The grinding wheels 66 and 67 are operated by means of electric motors 68 and 69, and these motors are mounted upon arms 70 and 71, which may be horizontally and vertically adjusted in the manner previously described. In Fig. 15 and Fig. 18, the parts of the adjusting mechanism are indicated by the same reference letters as in Fig. 10 and in Fig. 11.

The grinding wheels 66 and 67 may have different shapes, if they operate upon blanks whose ends have different shapes.

During the trimming and shaping operations previously specified, each of the blanks has been continuously turned about its own axis. If it is desired to shape the end of a blank into chisel shape, or to provide a planar surface, the blanks must now be held against rotation.

In the shaping operations previously specified, the rollers 22 have been kept turning by contact with the rails 35. Said rollers 22 now leave said rails 35. However, the rollers 26 are still kept in contact with the strip 30 so as to maintain the necessary pressure for gripping the blanks, without turning said blanks.

For this purpose, the first carrier which has previously been mentioned, is associated with a second carrier having endless belt 72, as shown in Fig. 8. The member 72 may be made of flexible steel or any material. It passes over a pair of turnable sprockets or drums 73 and 74, as shown in Fig. 2a.

Referring to Fig. 8, the belt 72 has a series of castings 75 connected thereto, by means of bolts 76, which pass through cross members 77. Each said casting 75 is provided with ends having planar surfaces 78, so that each said casting 75 has a right-angle corner at one end thereof. Each casting 75 is provided at its front and rear with a pair of rollers 79 and 80, which can turn relative to said casting 75, and said rollers 79 and 80 roll upon tracks 81.

As shown in Fig. 9, there are a pair of such tracks 81, and the rollers 79 and 80 are respectively arranged in pairs.

As shown in Fig. 8, the cross bars 20 of the belt 17 abut the angular corners of the castings 75, so that the belt 72 is driven by the belt 17.

The rollers 22 of the upper run of the belt 17 thus ride upon and move in unison with the castings 75, so that said rollers 22 are raised above and out of contact with the rails 35. This increases the clamping pressure upon the blanks B, since rollers 26 still contact with stationary friction strip 30, and the frictional grip on blanks B is sufficient to hold them against turning. Likewise, since the rollers 22 move in unison with the castings 75, there is no force which tends to turn the rollers 22, and the pressure between rollers 22 and castings 75 prevents the turning of said rollers 22.

The mechanism for forming a chisel shaped end or ends upon the blank B is shown in Figs. 20 and 21, and this is generally the same as the mechanism which is shown in Figs. 15-17 inclusive.

Bolts 65 support pulleys which are driven by motors 84 (see Fig. 1a) and said motors and the brackets to which said pulleys are connected, are connected to horizontally and vertically adjustable arms 60, so that the shaping belts 82 and 83 can be horizontally and vertically adjusted. Likewise said shaping belts 82 and 83 may be caused to operate at different angles, by means of control mechanism which is similar to that previously described in connection with Fig. 15. The belts 82 and 83 operate at the tops of the blanks. Similar belts 82a and 83a, shown in Fig. 21, operate at the bottoms of the ends of the blanks.

Likewise, and as shown in Fig. 23, we can use a single shaping belt 83a, omitting the use of the belt 83, in order to form a blank with a chisel-end, having a single inclined planar face 86.

In an ordinary chisel-shaped end of the type previously shown, there are two planar surfaces whose line of intersection is perpendicular to the axis of the blank and the side-faces of said end have equal angles. The machine may also be utilized for forming a chisel-shaped end of the type shown in Fig. 27, in which the side-faces of said chisel-shaped end have unequal angles. Likewise the line of intersection of the planar faces may be inclined to the central longitudinal axis of the blank. For this purpose the attachment shown in Figs. 24, 25, and 26a—26d inclusive, may be utilized.

The frame F of the machine is provided with a rod or stud-shaft 93 which is fixed to said frame.

Arms 92 can be turned relative to the rod 93, and each arm 92 can be fixed to its rod 93 in any desired adjusted position, so as to maintain each arm 92 in the adjusted position. Said arms 92 are adjusted so that they are parallel to each other.

Sleeves 94 are turnably mounted upon the rod 93. Each of said sleeves 94 has a pair of arms 90 and 91 connected thereto, so that the arms 90 and 91 can turn relative to the stud-shaft 93, and each pair of arms 90 and 91 are always inclined to each other at a fixed relative angle. Said sleeves may be coupled, if desired, so that they turn in unison so that arms 90 are always parallel to each other, and arms 91 are always parallel to each other. Each arm 92 is provided with a shoe 96, at the bottom end thereof. This shoe is held horizontal. Each said shoe 96 has horizontal and planar top and bottom faces.

The top surface of each shoe 96 is at the same level as the bottom of each blank B.

As shown in Fig. 25, the ends of each blank move slightly spaced from or in sliding contact with the top surfaces of shoes 96. Likewise, and as shown in Fig. 25, the rail 29 is interrupted at a point where the frame members have recesses 99. At this point, the downward pressure on rollers 26 is released, so that the blanks can turn freely about their axes. While the rollers 28 are mounted on anti-friction bearings, it is desirable to release the pressure on said rollers, so that rollers 22 are not pressed against castings 75. This point corresponds to Fig. 26b, which shows how the ends of the blank have been moved close to the rear edges of shoes 96, without turning the blank relative to shoes 96, up to this point.

The blank can now be turned without turning the associated pairs of rollers 22, because the blank now rests lightly upon said rollers 22.

The friction of the bottom of the blank against shoes 96 now causes the blank to be turned to the position shown in Fig. 26c. This turning may be caused in part by the weight of arms 91, so that the planar end-faces of the blank abut the bottom planar faces of said arms 91.

The arms 90 and their associated arms 91 are now upwardly turned by rollers 26, which contact with and raise the shoe 90a of arms 90. This is shown in Fig. 26d. Fig. 26c and Fig. 26d show how arms 91 are turned upwardly, after the blank has been turned to the position shown in Fig. 26c, so that the blank can be moved forward without interference from arms 91. Rollers 26 now again contact with friction strip 30, thus pressing the blank with sufficient force to hold it against turning, since rollers 22 are held against turning by being pressed against castings 25.

When the shoe 90a is moved upwardly, it enters recess 99.

Referring to Figs. 26a–26d inclusive, a planar face has been formed at one or both ends of the blank prior to the turning operation illustrated in said figures, and said planar face is inclined to the central longitudinal axis of the blank.

After the blank has been turned to the position illustrated in Fig. 26d, the other planar face is then ground at one or both ends of the blank so as to form the type of stick shown in Fig. 27.

The device for grinding the second planar surface of the blank, which has the first planar face illustrated in Figs. 26a–26d, has already been described.

In forming the planar faces previously described, in order to produce a wedge-shaped tip, the planar faces are ground in succession.

The device for turning the blank in the manner illustrated in Figs. 26a–26d can be rendered inoperative, by means which are shown in Fig. 24 and Fig. 25.

Fig. 24 shows a hand wheel 97, which has an internally threaded boss, and said boss is mounted upon the externally threaded portion of a pin or stud-shaft 98, which is fixed to the frame F of the device. The arms 90 have extensions 90b, which can abut the underside of the pin 98.

When the wheel 97 is turned until its boss clears the adjacent member 90b, said members 90b move to the position shown in Fig. 25, in which they abut pin 98, so that the arms 90 and 91 can move to the operative position shown in Fig. 25.

When the attachment shown in Fig. 25 is to be rendered inoperative, the operator turns an arm 90 in the clockwise direction relative to the stud-shaft 93, and the operator then turns the wheel 97 so that it moves towards the adjacent frame member. When the operator then releases the member 90b the levers 90 turn in the counter-clockwise direction, until one member 90b abuts the underside of the boss of the wheel 97. In this position the arms 90 have been angularly displaced in the clockwise direction from the position shown in Fig. 25, so that the arms 90 and 91 are rendered inoperative. In this inoperative position, the shoe 90a has been moved upwardly until it occupies the recess 99. The arms 92 can also be turned so that their shoes 96 will not contact with the blanks. Said pin 98 serves as a stop, so that arms 90 and 91 cannot turn below the position illustrated in Fig. 25.

The grinding or shaping operation or operations now having been completed, the stick is polished or buffed by additional means.

These polishing or buffing means are shown in

Figs. 1b, Fig. 2b and the details thereof are shown in Figs. 28, 29, 30, and 31.

As shown in Fig. 1b and Fig. 2b, four buffing wheels 100, 101, 102, and 103 are provided. These buffing wheels are of identical construction and each of them consists essentially of a rigid core having a peripheral facing of polishing cloth or the like. Since these buffing members and the means for driving the same are identical, the same description applies to each of them.

These buffing members are respectively operated by motors 104, 105, 106, and 107, which operate the buffing wheels by means of suitable belt drives or the like. Each of said buffing motors is mounted upon a bracket 108, which can be vertically adjusted by the mechanism previously described.

We have not shown any horizontal adjustment of the buffing wheels, although this could be provided if desired.

The buffing wheels 100 and 103 polish the ends of the blanks. The buffing wheels 101 and 102 polish the intermediate portions of the blanks.

The shafts of these buffing wheels are suitably inclined to the longitudinal axis of the blank, so that as the series of buffing wheels operate, they polish each and every part of the blank. Said buffing wheels may have soft peripheral buffing members.

Referring to Figs. 1b, 30 and 31, aligned and longitudinally spaced rails 109 are provided, and each rail 109 is substantially perpendicular to the blanks, and it is located over the central parts of the blanks. Each rail 109 has a friction facing 110 which is made of soft rubber or the like, so that it can engage the tops of the blanks B frictionally. These rails 109 are supported in brackets 109a.

Likewise, and prior to the buffing operations, the blanks are transferred from the belt 17. As shown in Fig. 1a and Fig. 2a, as the belt 17 passes around the left-hand drum sprocket 32, the blanks are allowed to roll down spaced and inclined guide members 111, which contact with the ends of the blanks.

The ends of the blanks B overlie the right-hand ends of the inclined members 111, as said blanks arrive at the top portion of the left-hand drum 32.

As the blanks B contact with members 111, links 24 are raised by said members 111, so that the rollers 28 release the ends of the blanks.

Fig. 2b shows how the blanks B roll down the inclined surfaces 111 until said blanks are taken up by a third carrier having an endless belt 112, which passes around the sprockets or drums 113 and 114. The belt 112 is an endless belt made of steel or other flexible metal or suitable material.

As shown in Figs. 30 and 31, the belt 112 is provided with rigid metal members 114. Said rigid metal members 114 are provided with central bores through which pass rivets 115, which rigidly connect said projecting members 114 to the belt 112. Each of said rigid members 114 is provided at its ends with a pair of rollers 116 and 117. For this purpose, and as shown in Fig. 30, each member 114 is provided with reduced ends 114a. The rollers 116 and 117 contact with, and turn upon, fixed rails 116a and 117a.

Hence, and as shown in Fig. 31, the adjacent peripheries of adjacent rollers 116 (or 117) turn in opposite directions. This causes the blanks to turn around their own axes during the buffing operation, this turning also being caused during certain periods by the frictional contact of the blanks with the friction strips 110 of the fixed longitudinal rails 109.

As shown in Figs. 28 and 30, the blank is unsupported at its ends, when the ends of the blank are being buffed.

As shown in Fig. 29, while the buffing wheels 101 and 102 buff the intermediate portions of the blank, the ends of the blank are located between, and said ends are guided by, rails 118 and 119 which are fixed to the frame of the machine. Fixed rubber strips 120 and 121 are connected to said rails 118 and 119 and the ends of the blanks are pressed against said strips 120 and 121, in order to keep the blanks in proper position, and to cause them to turn.

The rails 109 are provided only in combination with the buffing wheels 100 and 103, when the ends of the blank are being polished.

Referring to Fig. 2b and Fig. 32, after the buffing has been completed, the blanks B are removed from the third belt 112, by means of belts 122, having inclined upper runs. As shown in Fig. 32, the belts 122 pass around pulleys 123 and 124, each pulley 124 being of greater diameter than its companion pulley 123. The upper inclined runs of the removing belts 122, operate substantially like the members 111 which have been previously described.

Referring to Fig. 32, this shows a motor 125, having on its shaft a sprocket 126 which is provided with a chain 127. The chain 127 drives a sprocket 128. The shaft of this sprocket 128 has a worm 129 and this drives a worm wheel 130 which is keyed to the shaft 131, which is connected to shaft 131a by means of a universal joint 132. The shaft 131a is provided with end-thrust bearings 133 and 133a. Said shaft 131a is likewise provided with a worm 134, which operates gear 135, said gear 135 being keyed to the shaft of the drum 114.

The shaft of the gear 135 is provided with a sprocket 136, and this has a chain 137, which drives a sprocket 138, which is provided on the common shaft of the pulleys 124, which operate belts 122. The blanks B roll down the upper inclined run of the belts 122, and these blanks are taken up by the pockets of a drum 139.

This drum 139 is intermittently turned in the same direction. For this purpose, and as shown in Fig. 2b, the shaft of the drum 139 is provided with a ratchet wheel 150. Said ratchet is intermittently turned in the counter-clockwise direction, by means of a pawl which is connected in the usual manner to a link 151. The link 151 is pivotally connected to a crank arm 152, which is keyed to the oscillating shaft 142, which is shown in Fig. 32. A cam-follower 141 is keyed to the shaft 142, and this cam-follower 141 is turned to-and-fro by means of a face cam 140 which is keyed to the shaft 131.

The cam-follower 141 is provided with the usual roller 141a.

The particular type of printing illustrated herein, utilizes a coated strip of paper S or other suitable material, and the coating can be applied to the blanks by means of suitable heat and pressure. Said strip is wound spirally upon a spool 153, which is mounted in suitable bearings. The strip S is pulled off spool 153 by means of feed rollers 154.

As each blank B passes to the printing position, a heated die-support 155 is reciprocated, and said die-support has a die or printing member 156, which corresponds to the impression which is to be made. This heated member 156 perforates the strip or ribbon S and deposits the printing composition with which said strip S has been coated, upon the blanks B.

As shown in Fig. 32, the die-support 155 is connected to a rack 157, which is reciprocated by means of a toothed segment 158, which is keyed to shaft 142.

An adjusting screw 159 is adjustably connected to the frame for limiting the stroke of the rack 157 in one direction.

A follower 160 is also provided for the rack 157 and this follower 160 is connected to and its movement is guided by means of a bolt 161a. The bolt 161a passes slidably through a frame member. The head of the bolt 161a can limit the movement of follower 160 in one direction. The member 155 is located in a holder 161 which is suitably connected to follower 160. Suitable slide bearings are provided for these reciprocating parts.

The heating element H may be any suitable heater.

The rollers 154 are pressed against each other, and the upper roller 154 is intermittently turned by means of an arm 143 which is keyed to the shaft 142, a link 144, and a pawl carrier 145 to which the link 144 is pivotally connected. The pawl carrier 145 carries a pawl 146 which operates a ratchet wheel which is mounted upon the shaft of the upper roller 154.

The first belt 17 is driven by a motor 200 shown in Fig. 2a.

As shown for example in Fig. 18, the machine may be provided with a bottom frame member Fa, upon which the rollers 26 turn and on which said rollers 26 are supported, in the bottom run of the carrier 17. The second or intermediate carrier is provided with a similar support Fb for the bottom run thereof, as shown in Fig. 28.

The drawings also show a number of castings C. The brackets for supporting the grinding belts, etc., and the pulleys on which said belts are mounted, may be supported on said castings, which can be adjusted vertically and/or horizontally, as previously described.

We have shown a preferred and complete embodiment of our invention, whereby continuously operated carrier means can be utilized. However, we do not wish to be limited to the details described, and the invention includes many valuable sub-combinations, as distinguished from the complete machine.

If desired we can eliminate the use of the arms 92 and their associated shoes 96, since the contact of the blanks with the weighted levers 91 is sufficient to turn the blanks around their own axes.

It will be noted that the blanks are gripped and turned, or gripped and held against turning while the blanks are held intermediate their ends, since the complete machine illustrated shapes both ends of the blank. However, if for any reason it would be desired to shape only one end of the blank, each said blank could be held at one of its ends. Likewise while we prefer to use the combinations of rollers illustrated herein, instead of using chucks or other gripping members having jaws between which the blanks are held, we do not wish to be limited, in certain aspects of the invention, to any particular type of means for holding the blanks.

For convenience in defining the invention in the claims, it may be stated that the rollers 22 and 28 are arranged in groups, each group constituting roller means for holding the respective blanks. Likewise, each said group of roller means has some roller-means, namely, the rollers 28, which are movable bodily towards and away from the other roller means.

For convenience in stating the invention in certain of the claims, we have referred to the parts by reference numerals. However, in so doing we do not wish to be limited to the construction or to the details set forth in the description herein.

We claim:

1. In a machine of the class described, an endless carrier, means adapted to support and guide said endless carrier so that it has an upper run and a lower run, said carrier having groups of roller means connected thereto, each group of roller means having roller elements located one above the other and adapted to hold a blank, between said roller elements, and means for finishing the blank while it is held on said carrier.

2. In a machine of the class described, an endless carrier, means adapted to support and guide said endless carrier so that it has an upper run and a lower run, said carrier having groups of roller means connected thereto, each group of roller means comprising roller elements which are adapted to hold a blank, each group of roller means comprising some holding roller elements which are movable bodily towards and away from the other holding roller elements, and means for finishing the blank while it is held on said carrier.

3. In a machine of the class described, an endless carrier, means adapted to guide and support said endless carrier so that it has an upper run and a lower run, and rollers connected to said endless carrier, said rollers being arranged in groups, some of said rollers in each group being non-movable towards and away from said carrier, other rollers in each group being movable towards and away from said carrier, each group of rollers being adapted to hold a blank between the movable and non-movable rollers, and means for finishing the blank while it is held on said carrier.

4. In a machine of the class described, an endless carrier and means adapted to support and guide said endless carrier so that it has an upper run and a lower run, rollers connected to said endless carrier and movable towards and away from said endless carrier, and means for urging said rollers towards said carrier, and additional means associated with said rollers, said additional means and said rollers being adapted to hold blanks between them, and means for finishing the blanks while they are held on said carrier.

5. In a machine of the class described, the sub-combination of means adapted to support and guide an endless carrier so that it has an upper run and a lower run, spaced bearing-members connected to said carrier and located at the outer face of said carrier, each said bearing-member having turnably supported rollers at its ends, said bearing-members also having links turnably connected thereto, said links being inclined to the adjacent surface of the carrier, the ends of said links which are furthest away from the carrier also having rollers connected thereto, the rollers being arranged in groups each of which is adapted to hold a blank between the rollers of said groups, means for feeding the blanks to said groups of rollers, and means for finishing the blanks while they are held on said carrier between said groups of rollers.

6. In a machine of the class described, the sub-combination of means adapted to support and guide an endless carrier so that it has an upper run and a lower run, spaced bearing-members connected to said carrier and located at the outer face of said carrier, each said bearing-member having turnably supported rollers at its ends, said bearing-members also having links turnably connected thereto, said links being inclined to the adjacent surface of the carrier, the ends of said links which are furthest away from the carrier also having rollers connected thereto, the rollers being arranged in groups each of which is adapted to hold a blank between the rollers of said groups, and means associated with the upper run of said carrier and adapted to turn said links so that the rollers carried by said links are forced towards the rollers carried by said bearing-members, means for feeding the blanks to said groups of rollers, and means for finishing the blanks while they are held on said carrier between said groups of rollers.

7. In a machine of the class described, an endless carrier 17 and means adapted to support and guide said endless carrier so that it has an upper run and a lower run, bearing-members 18 connected to said carrier 17, and located at the outer face of said carrier 17, blank-supporting rollers 22 turnably carried by said bearing-members 18, arms 24 turnably mounted on said bearing-members 18, shafts 25 carried by the outer ends of said arms 24, additional rollers 28 mounted on said shafts 25, said additional rollers 28 being turnable relative to their shafts 25, each additional roller 28 being located adjacent a pair of blank-supporting rollers 22, the blank-supporting rollers 22 and additional rollers 28 being arranged in groups each of which is adapted to hold a blank, pressure rollers 26 connected to the shafts 25, and a rail located above the upper run of the carrier 17, said rail being adapted to contact with the pressure rollers 26 and to force the additional rollers 28 towards their cooperating blank-supporting rollers 22 and means for finishing the blank while it is held on said carrier.

8. A device according to claim 7 in which the bearing-members 18 have stops 27 which are adapted to limit the turning movement of the arms 24, in the lower run of the carrier 17.

9. In a machine of the class described, the combination of a first belt carrier 17 and a second belt carrier 72, the second belt carrier 72 being shorter than the first belt carrier 17, the ends of the second belt carrier 72 being between the ends of the first belt carrier 17, means adapted to support and guide said first and second belt carriers 17 and 72 so that each of them has an upper run and a lower run, and a part of the upper run of the first belt carrier 17 overlies the upper run of the second belt carrier 72, means adapted to operate the first belt carrier 17 and the second belt carrier 72 in unison, the first belt carrier 17 having roller means arranged in groups, each said group of roller means being adapted to hold a blank between them, the second belt carrier 72 having non-turnable supporting members 75 upon which the adjacent roller means of said groups rest, in the overlapping portions of the upper runs of said belt carriers 17 and 72, and means adapted to shape the blank while it is held by said group of roller means.

10. In a machine of the class described, the combination of a first belt carrier 17 and a second belt carrier 72, the second belt carrier 72 being shorter than the first belt carrier 17, the ends of the second belt carrier 72 being between the ends of the first belt carrier 17, means adapted to support and guide said first and second belt carriers 17 and 72 so that each of them has an upper run and a lower run, and a part of the upper run of the first belt carrier 17 overlies the upper run of the second belt carrier 72, the first belt carrier 17 and the second belt carrier 72 being operated in unison, the first belt carrier 17 having roller means arranged in groups, each said group of roller means being adapted to hold a blank between them, the second belt carrier 72 having non-turnable members 75 upon which the adjacent roller means of said groups rest in the overlapping portions of the upper runs of said first and second belt carriers 17 and 72, and means independent of said belt carriers and adapted to turn said blanks around their own axes, while said roller means contact with said non-turnable members 75, and means adapted to shape the blank while it is held between said group of roller means.

11. In a machine of the class described, the combination of a first belt carrier 17 and a second belt carrier 72, the second belt carrier 72 being shorter than the first belt carrier 17, the ends of the second belt carrier 72 being between the ends of the first belt carrier 17, means adapted to support and guide said first and second belt carriers 17 and 72 so that each of them has an upper run and a lower run, and a part of the upper run of the first belt carrier 17 overlies the upper run of the second belt carrier 72, the first belt carrier 17 and the second belt carrier 72 being operated in unison, the first belt carrier 17 having roller means arranged in groups, each said group of roller means being adapted to hold a blank between them, the second belt carrier 72 having non-turnable members 75 upon which the adjacent roller means of said groups rest in the overlapping portions of the upper runs of said first and second belt carriers 17 and 72, and means adapted to shape the blanks while said roller means are in contact with said non-turnable members 75.

12. In a machine of the class described, the combination of a carrier and means adapted to actuate and guide said carrier so that it moves in an endless path, roller means connected to said carrier, said roller means being arranged in groups, each group being adapted to hold a blank, and means adapted to hold said roller means against turning in a predetermined portion of the path of movement of said carrier, so that the blanks are held against turning in said predetermined portion of said path, and means adapted to shape said blank while it is held by said group.

13. In a machine of the class described, a belt carrier, means adapted to support and guide said belt carrier so that it has an upper run and a lower run, roller means connected to said belt, said roller means being arranged in groups, each said group being adapted to turnably grip a blank between the roller means of said groups so that the blank can be turned about its own axis, and buffing means adapted to operate upon the upper exposed portions of said blanks.

14. In a machine of the class described, a belt carrier, means adapted to support and guide said belt carrier so that it has an upper run and a lower run, roller means connected to said belt, said roller means being arranged in groups, each said group being adapted to turnably grip a blank between the roller means of said groups so that the blank can be turned about its own axis, and buffing means adapted to operate upon the upper exposed portions of said blanks, said buffing means comprising a plurality of buffing members which are operated in a direction inclined to the longitudinal axes of the blanks.

15. In a machine of the class described, a belt carrier, means adapted to support and guide said belt carrier so that it has an upper run and a lower run, roller means connected to said belt, said roller means being arranged in groups, each said group being adapted to turnably grip a blank between the roller means of said groups so that the blank can be turned about its own axis, and buffing means adapted to operate upon the upper exposed portions of said blanks, said buffing means comprising a plurality of buffing members which are operated in a direction inclined to the longitudinal axes of the blanks, said buffing members operating upon different portions of the blanks and means adapted to prevent movement of the blanks in a direction parallel to the axes of the blanks.

EARL G. SCHLAYER.
GERHARD F. KULLACK.